United States Patent [19]  
Bellacicco

[11] 3,936,255  
[45] Feb. 3, 1976

[54] DOUGH EMBOSSING APPARATUS
[75] Inventor: Joseph Vito Bellacicco, Elmhurst, N.J.
[73] Assignee: Bellacicco & Sons, Inc., Queens Village, N.Y.
[22] Filed: July 15, 1974
[21] Appl. No.: 488,445

[52] U.S. Cl. ............... 425/101; 425/373; 425/230
[51] Int. Cl.² ........................................ A21C 11/04
[58] Field of Search ........... 425/373, 101, 230, 102, 425/104, 337

[56] References Cited
UNITED STATES PATENTS

| 1,134,971 | 4/1915 | Loose | 425/337 |
|---|---|---|---|
| 1,305,127 | 5/1919 | Lawson | 425/104 X |
| 1,871,753 | 8/1932 | Smith | 425/337 |
| 3,417,713 | 12/1968 | Schwebel | 425/102 X |
| 3,536,014 | 10/1970 | Kurchuris et al. | 425/230 X |
| 3,635,638 | 1/1972 | Bryan | 425/373 |
| 3,802,824 | 4/1974 | Amster | 425/230 X |
| R17,711 | 6/1930 | Scruggs | 425/101 |

FOREIGN PATENTS OR APPLICATIONS

| 676,379 | 7/1952 | United Kingdom | 425/230 |

Primary Examiner—Francis S. Husar  
Assistant Examiner—David S. Safran  
Attorney, Agent, or Firm—Philip D. Amins

[57] ABSTRACT

The present invention pertains to an automatic and continuous dough processing apparatus for embossing designs into wads of dough formed in predetermined masses. The apparatus includes an endless belt for receiving the dough masses and transporting them toward a rotary embossing wheel for imparting designs to the dough masses. The processing apparatus further includes a rotary brush which has its periphery simultaneously in contact with the embossing wheel and the upper surface of the dough masses. The brush is adapted to clean the embossing wheel and coat the dough surface with liquid supplied from a reservoir positioned thereabove. The apparatus also includes a mobile frame for housing all of the above-mentioned members and an electrical power drive member which is operatively coupled to the endless belt, the embossing wheel and the rotary brush.

18 Claims, 22 Drawing Figures

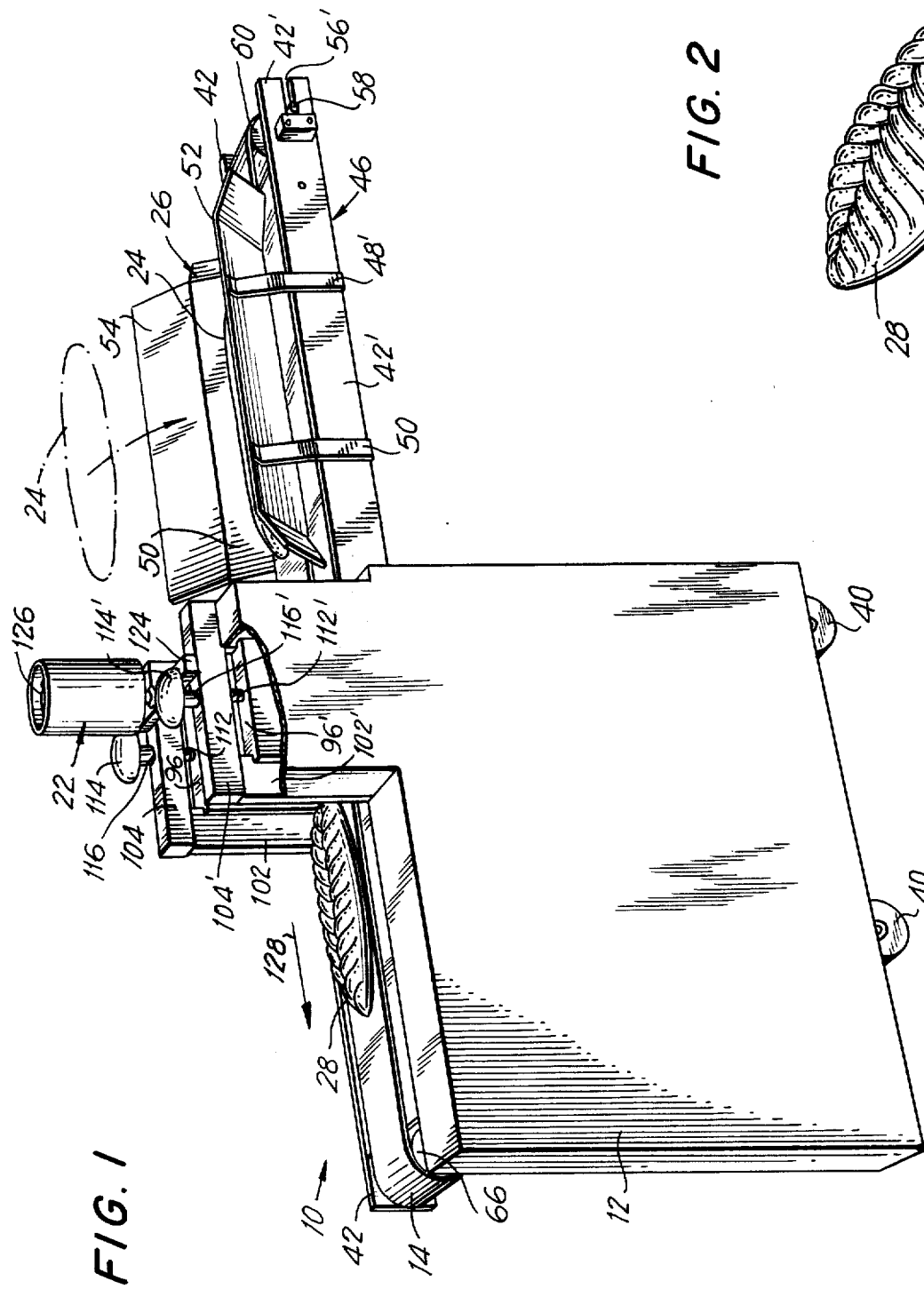
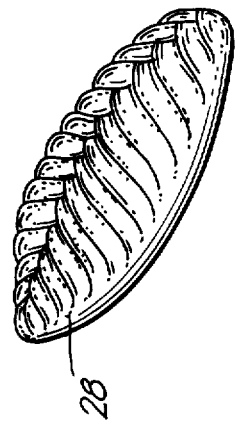

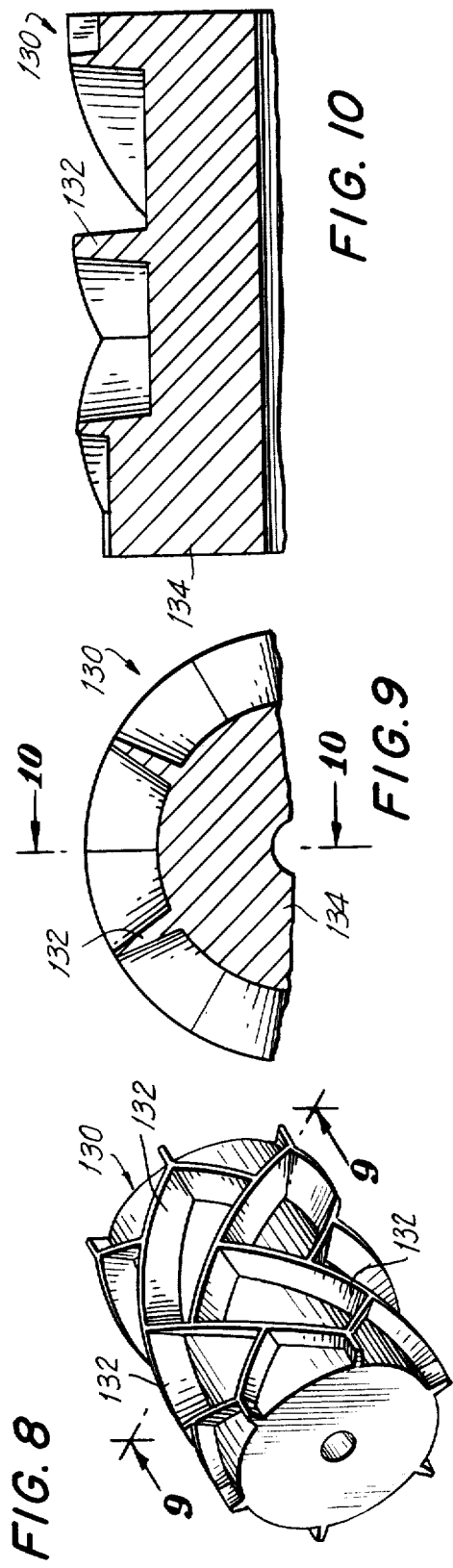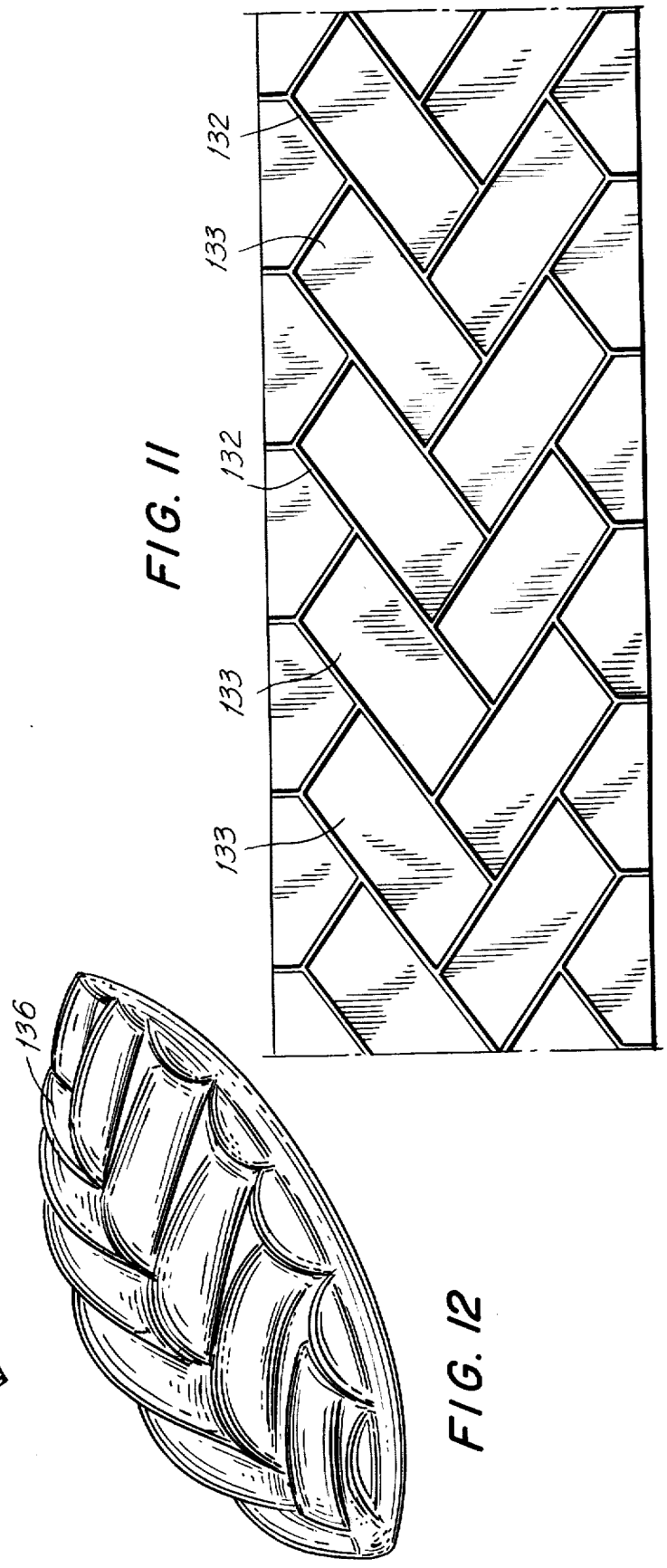

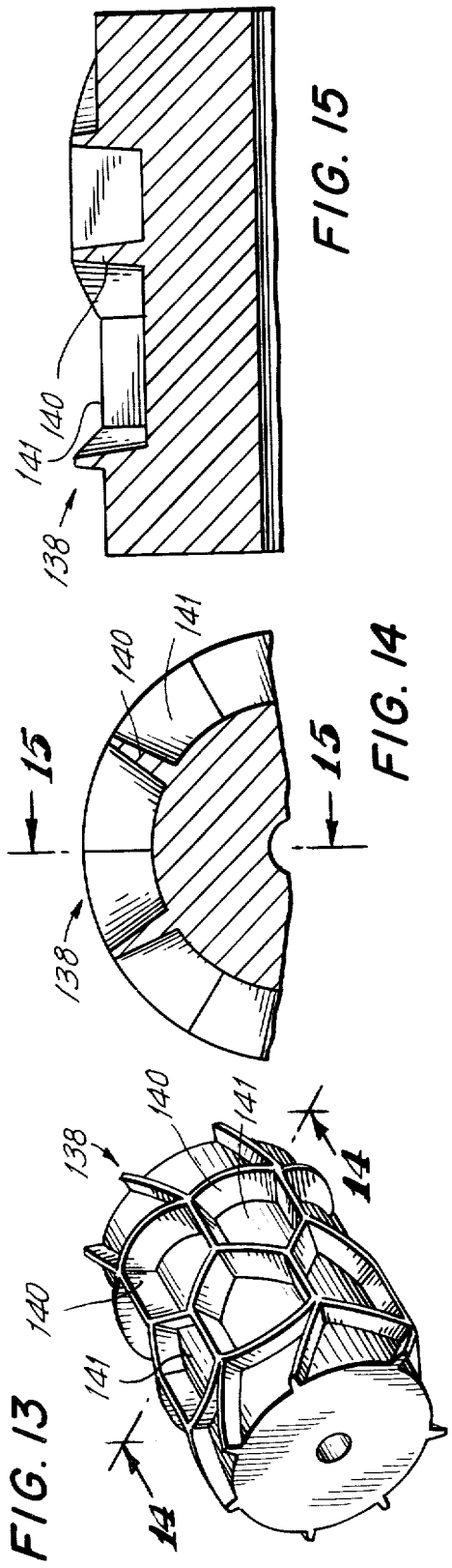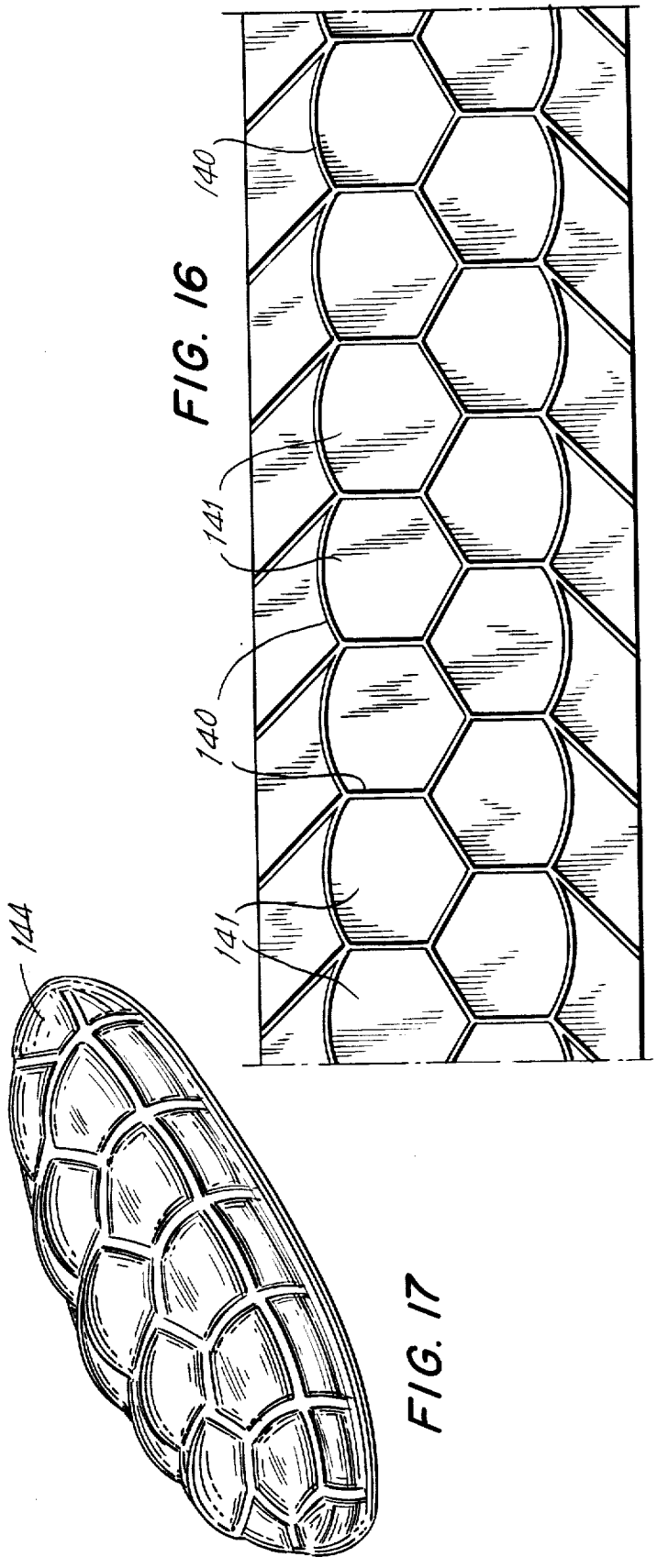

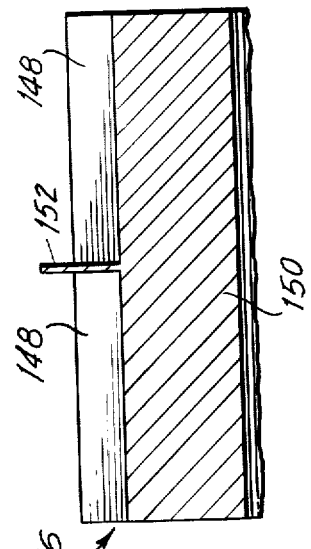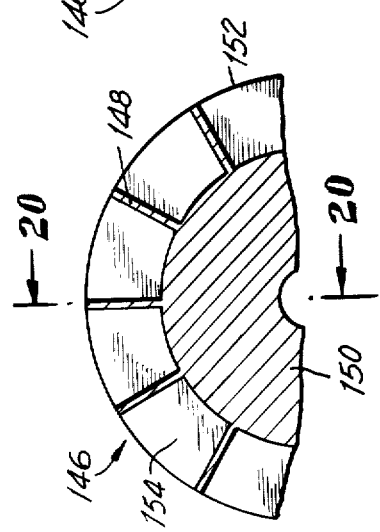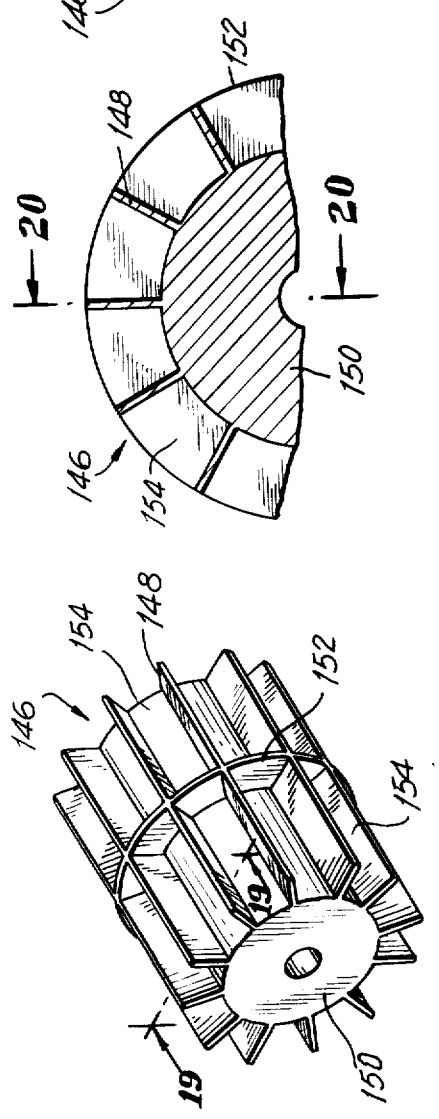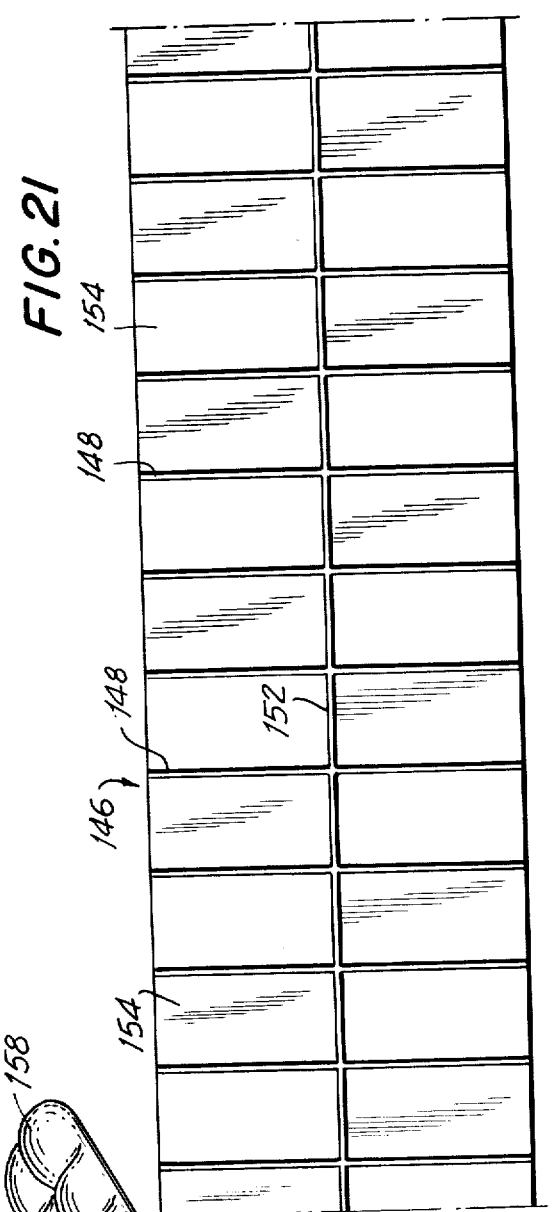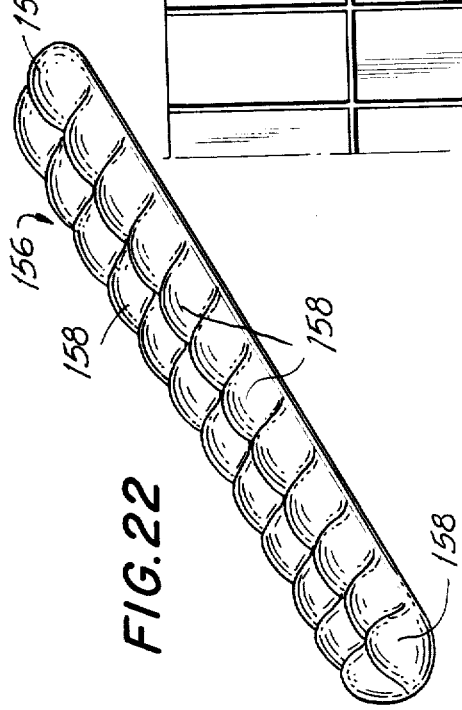

DOUGH EMBOSSING APPARATUS

BACKGROUND OF THE INVENTION

The present invention relates to dough processing apparatus and, in particular, to an automatic and continuous dough processing apparatus which embosses designs into wads of dough formed in predetermined masses.

Dough processing apparatuses, known in the prior art and of which we are aware, are adapted to provide a decorative design or place food matter such as seeds upon the upper surface of dough wads contained in pans adapted therefor prior to their placement in a baking oven. In the prior art, designs or food matter were provided by several manufacturers on the upper surface of the dough wads as a distinctive indicia so as to enable the consumer to distinguish his product from similar products made by other manufacturers.

The embossing provided by the present invention simulates the design created by the hand braiding of dough in manufacturing certain types of bread loaves, such as for example, in the manufacture of traditional Jewish bread known as "challah". Thus, by utilizing the embossing principle of the present invention, hand braided bread loaves may be manufactured in an automatic and continuous fashion with much less time spent in preparing each loaf.

The principles of the present invention may also be applied to embossing loaves of bread for aesthetic reasons as well as for dividing a predetermined dough mass into specific numbers, e.g., one dozen, two dozen, etc. of smaller sections which when broken apart after baking form, as an example, a conventional dinner roll.

SUMMARY OF THE INVENTION

Accordingly, it is the primary object of the present invention to provide an automatic and continuous dough processing apparatus which embosses predetermined dough masses to simulate the braiding thereof.

Another object of the present invention is to provide an automatic continuous means of dividing a predetermined dough mass into a specific number of smaller sections, e.g., rolls.

A further object of the present invention is to provide an automatic and continuous dough processing apparatus which includes a brush means in simultaneous intimate contact with the embossing means and the upper surface of the dough masses.

Thus, a dough processing apparatus for embossing a wad of dough formed in predetermined masses according to the present invention, in brief, comprises an endless belt having an upper surface in a generally horizontal plane adapted for movement along a longitudinal path, power drive means operatively coupled to the endless belt for providing movement thereof, frame means for mounting the power drive means and the endless belt, embossing means journaled in the frame means with its longitudinal axis transverse to the longitudinal path and operatively coupled to the power drive means for imparting a design to each predetermined dough mass, brush means journaled in the frame means with its longitudinal axis transverse to the longitudinal path and operatively coupled to the power drive means, the brush means being in peripheral engagement with the embossing means and the upper surface of the dough mass for cleaning the embossing means and coating the upper surface of the dough, and reservoir means affixed to the frame means and disposed above the embossing means and the brush means for storing and dispensing fluids to the embossing means and brush means as required thereby.

BRIEF DESCRIPTION OF THE DRAWINGS

The foregoing and other objects, features and advantages of the present invention will become more apparent from the detailed description hereinafter, considered in conjunction with the accompanying drawings, wherein:

FIG. 1. is a pictorial representation of an automatic and continuous dough processing apparatus for embossing designs into wads of dough formed in predetermined masses, constructed in accordance with the principles of the present invention;

FIG. 2 is a pictorial representation of an embossed loaf of bread;

FIG. 8 is a pictorial representation in perspective of one type of embossing wheel;

FIG. 9 is an enlarged fragmentary view in elevation taken substantially along the line 9—9 of FIG. 8;

FIG. 10 is a cross-sectional view taken substantially along the line 10—10 of FIG. 9;

FIG. 11 is a pictorial representation of the embossing wheel design shown in FIG. 9 when projected upon a flat surface;

FIG. 12 is a pictorial representation of a loaf of bread obtained after baking a predetermined mass of dough embossed by the wheel shown in FIG. 8;

FIG. 13 is a pictorial representation in perspective of another type of embossing wheel;

FIG. 14 is an enlarged fragmentary view in elevation taken substantially along the line 14—14 of FIG. 13;

FIG. 15 is a cross-sectional view taken substantially along the line 15—15 of FIG. 14;

FIG. 16 is a pictorial representation of the embossing wheel design shown in FIG. 13 when projected on a flat surface;

FIG. 17 is a pictorial representation in perspective of a loaf of bread obtained after baking a predetermined mass of dough embossed by the wheel shown in FIG. 13;

FIG. 18 is a pictorial representation in perspective of still another type of embossing wheel;

FIG. 19 is an enlarged fragmentary view in elevation taken substantially along the line 19—19 of FIG. 18;

FIG. 20 is a cross-sectional view taken substantially along the line 20—20 of FIG. 19;

FIG. 21 is a pictorial representation of the embossing wheel design shown in FIG. 18 when projected upon a flat surface; and FIG. 22 is a pictorial representation in perspective of two dozen dinner rolls formed in a loaf, after having been baked in a predetermined mass of dough and embossed by the wheel shown in FIG. 18.

DESCRIPTION OF THE PREFERRED EMBODIMENTS

Figure 3:
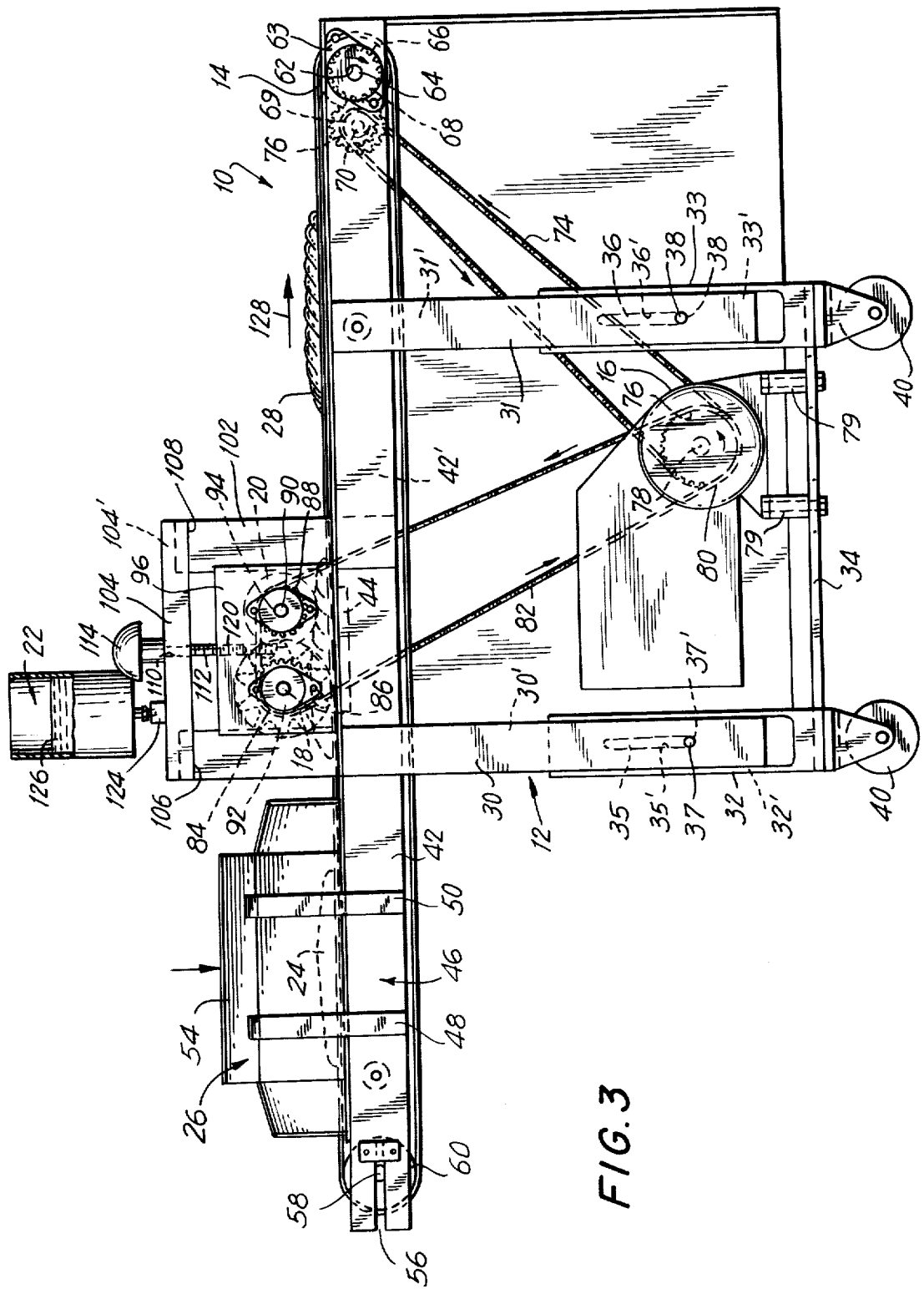
FIG. 3 is a side elevational view of the apparatus depicted in FIG. 1 with a portion of the protective cover removed.
Figure 4:
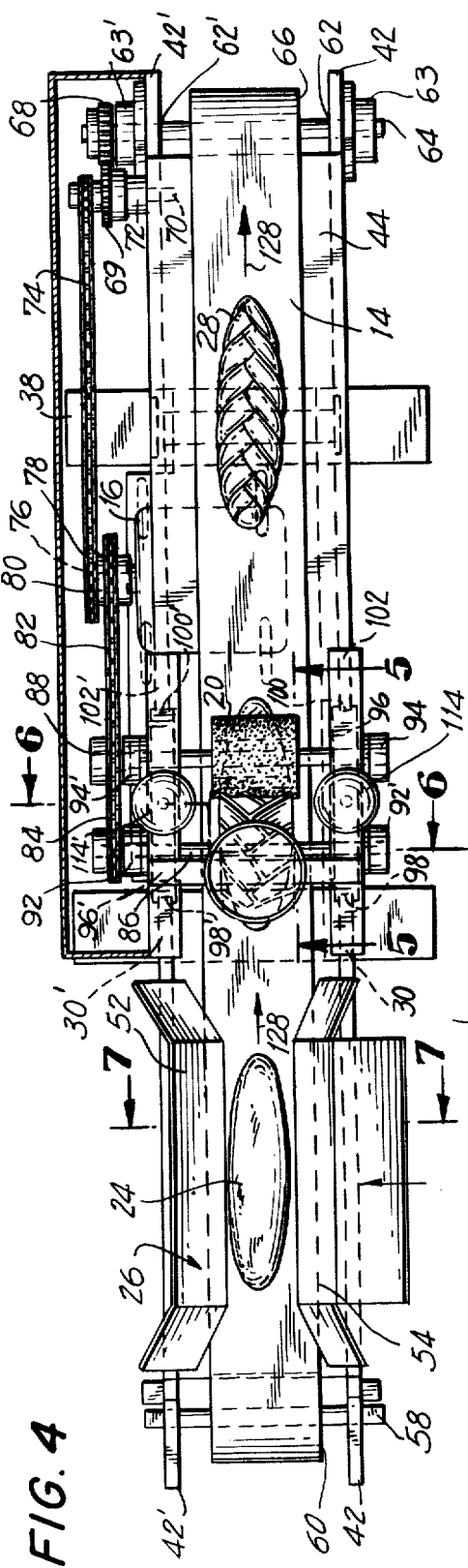
FIG. 4 is a top plan view of the apparatus shown in FIG. 1.
Figure 5:
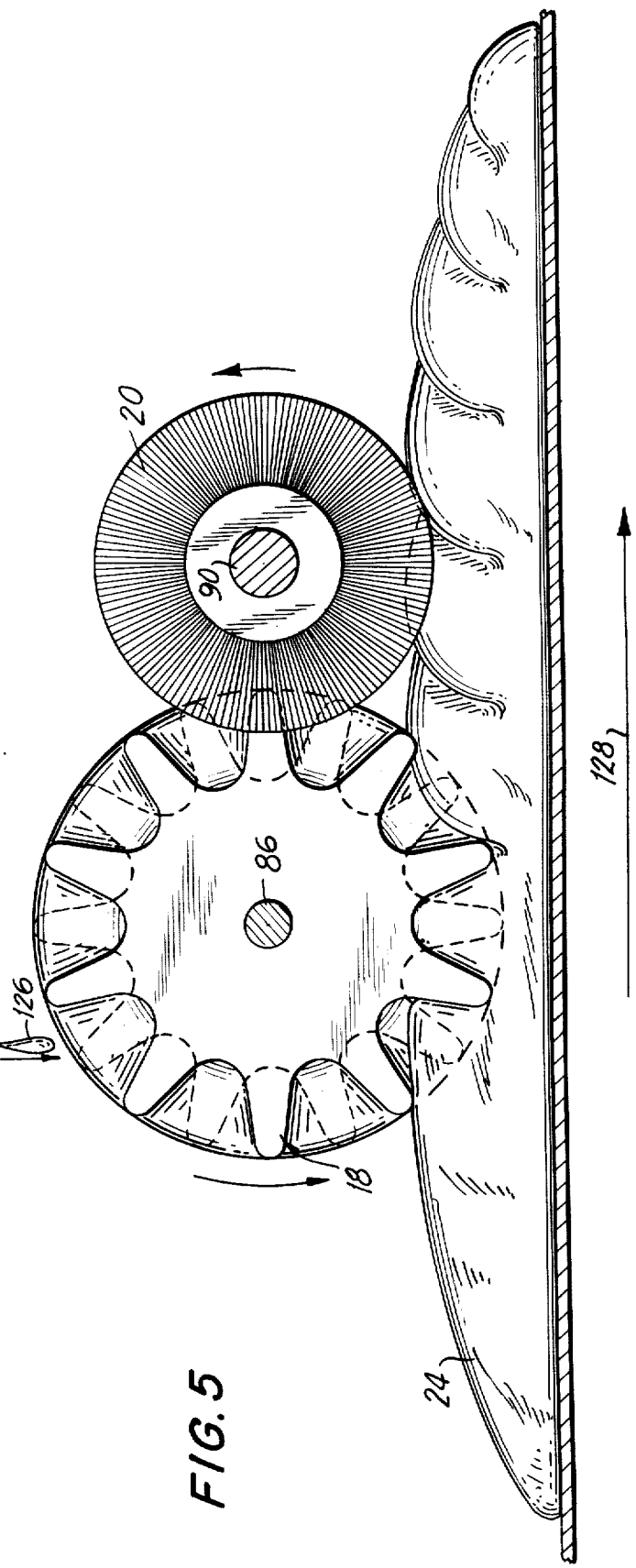
FIG. 5 is an enlarged fragmentary elevational view taken substantially along line 5—5 of FIG. 4.
Figure 6:
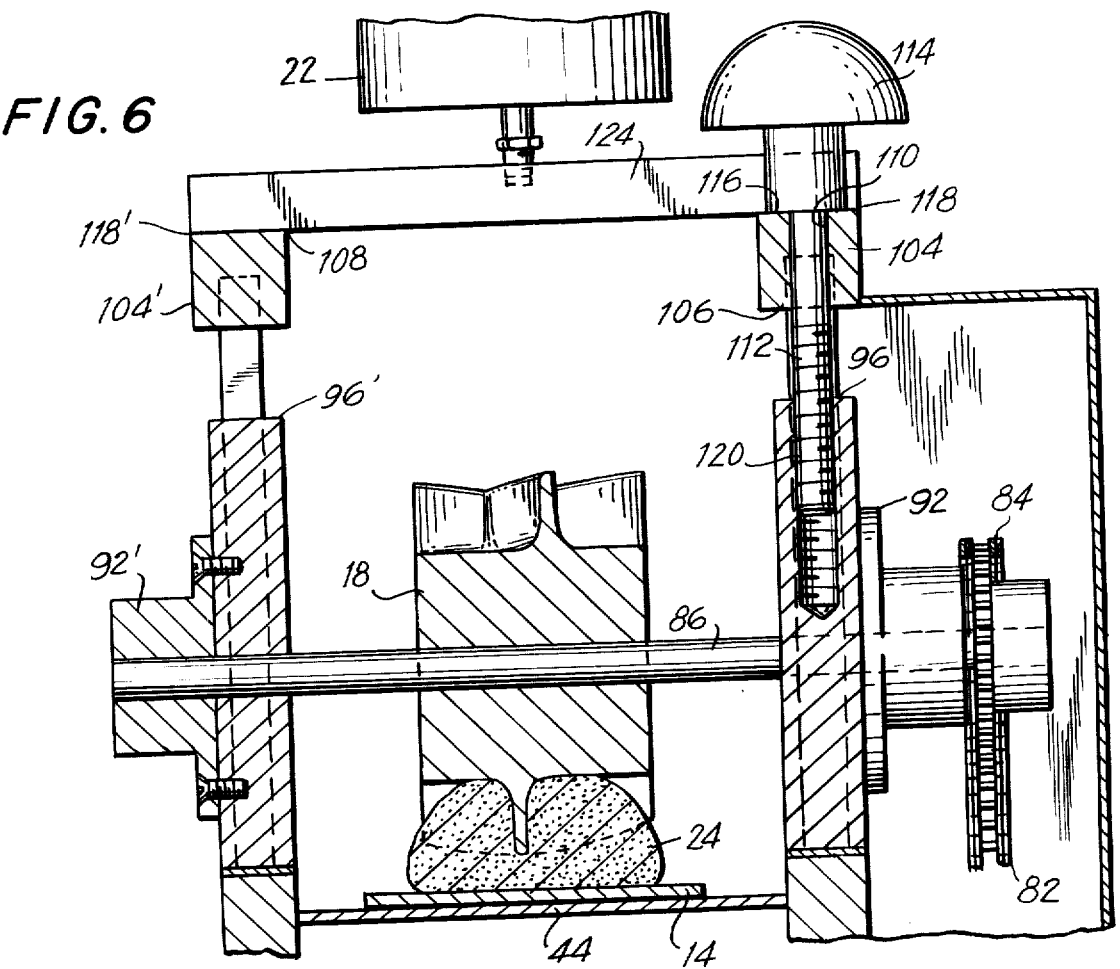
FIG. 6 is an enlarged fragmentary view taken substantially along line 6—6 of FIG. 4.
Figure 7:
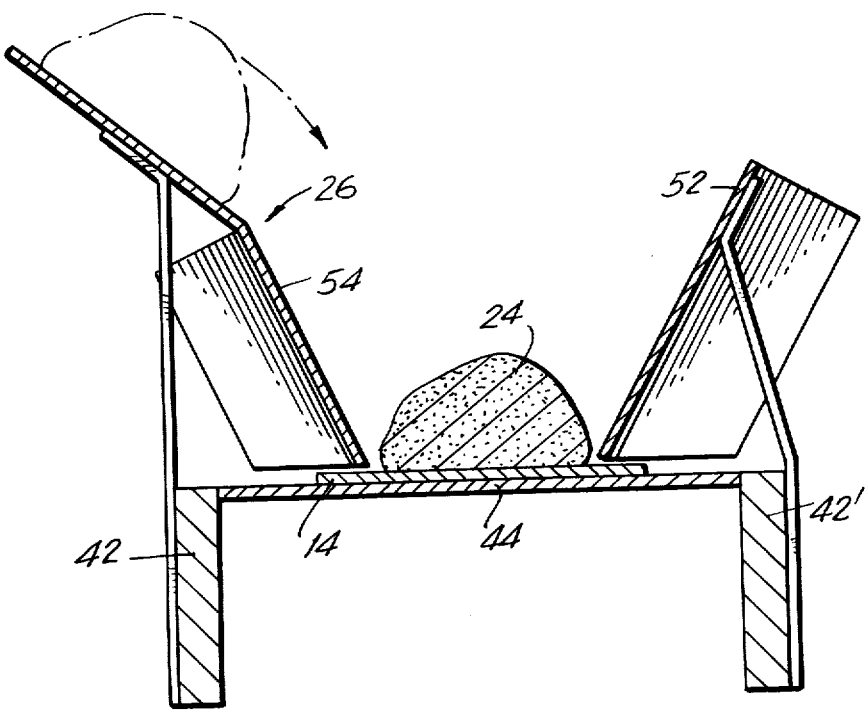
FIG. 7 is an enlarged fragmentary view taken substantially along the line 7—7 of FIG. 4.

Referring now to FIGS. 1 through 7, there is shown a dough processing apparatus 10 which is constructed according to the principles of the present invention. The apparatus 10 includes a mobile frame 12, an endless belt 14, an electrical motor 16 (shown in FIG. 3) which functions as the power drive means, a rotary embossing wheel 18, a rotary brush 20, a reservoir 22, mixing and dispensing means for forming the wads of dough 24 into predetermined masses (not shown) and guiding means 26 for guiding the dough onto the endless belt 14. The raw wads of dough 24 after passing under the rotary embossing wheel 18 and rotary brush 20 are formed, for example, into an embossed loaf of bread 28 (shown in FIG. 2) ready for baking in an oven.

The generally rectangular-shaped frame 12 includes vertical members 30, 30' and 31, 31' adjustably mounted within upright members 32, 32' and 33, 33', respectively, of the base portion 34. Upright members 32, 32', and 33, 33' are provided with elongated vertical apertures 35, 35' and 36, 36', respectively, which are adapted to receive studs 37, 37' and 38, 38', respectively, affixed to vertical members 30, 30' and 31, 32'. The end of studs 37, 37' and 38, 38' are threaded and adapted to cooperate with nut members, not shown.

After selecting the desired height of the vertical members 30, 30' and 31, 31', the nuts are tightened to lock the vertical members in position. The base portion 34 is also provided with wheel assemblies 40 thus making the frame 12 mobile.

A pair of horizontal members 42, 42' are affixed to vertical members 30, 31 and 30', 31', respectively. Members 42 and 42' extend in leftwardly and rightwardly direction (FIG. 3) from the vertical members 30, 30' and 31, 31'. A platen 44 extends in a rearwardly direction from horizontal member 42 to horizontal member 42' reinforcing the frame 12 and providing a flat horizontal surface whose function will be explained hereinafter. The leftwardly extending portion 46 of horizontal members 42 and 42' is provided with vertical support members 48, 48' and 50, 50' adapted to support sloping guide walls 52 and 54 of the guiding means 26. The terminal portions of leftwardly extending members 42 and 42' (FIG. 3) are provided with horizontally adjustable slotted apertures 56 and 56' for journaling the axle 58 of a belt support pully 60. The terminal portions of rightwardly extending members 42 and 42' (FIG. 3) are provided with apertures 62 and 62' for journaling the axle 64 of belt support pully 66. Included on the axle 64 is a gear 68 which is adapted to engage idler gear 69 mounted on axle 70. Axle 70 is adapted to be journaled in a support means 72 which is mounted on horizontal frame member 42'. Idler gear 69 is operatively coupled by means of a drive belt or chain 74 to drive gear 76 which is mounted on axle 78 of motor 16. Motor 16 is mounted on the base portion 34 of frame 12 by means of shock and vibration absorbing members 79. Coaxially mounted on axle 78 is an additional drive gear 80 which is operatively coupled by means of a drive belt or chain 82 to a gear 84 mounted on axle 86 of embossing wheel 18. Drive belt 82 also engages gear 88 mounted on axle 90 of rotary brush 20.

The axle 86 of embossing wheel 18 and the axle 90 of rotary brush 20 are adapted to be journaled in bearings 92, 92' and 94, 94', respectively, which are mounted in the vertically movable panel members 96 and 96', respectively.

The vertically movable panel member 96 is provided with channels 98 and 100 at each vertical distal end thereof. The channel 98 is adapted to slidably engage the upper portion of the vertical member 30 and channel 100 is adapted to slidably engage a vertical members 102 which preferably is parallel to and spaced from the upper portion of member 30 and affixed to horizontal member 42. Vertically movable panel member 96' is also provided with channels 98' and 100' at each vertical distal end thereof. Channel 98' is adapted to slidably engage the upper portion of vertical member 30' and channel 100' is adapted to slidably engage a vertical member 102' which preferably is parallel to and spaced from the upper portion of member 30' and affixed to horizontal member 42'.

A horizontal member 104 is affixed between the free terminal end 106 of the upper portion of vertical member 30 and the free terminal end 108 of vertical member 102. A horizontal member 104' is affixed between the free terminal end 106' of the upper portion of vertical member 30' and the free terminal end 108' of the upper portion of vertical member 102'. Centrally disposed between the distal ends of horizontal members 104 and 104' are clearance apertures 110 and 110', respectively, which are adapted to receive threaded shafts 112 and 112', respectively, for rotational movement therein. Shafts 112 and 112' are provided with knobs 114 and 114', respectively, which are affixed thereto on the upper ends thereof. Knobs 114 and 114' are provided with shoulders 116, 116' which are larger than the apertures 110 and 110', thus retaining the shaft and knob in a fixed position relative to the top surfaces 118 and 118' of horizontal members 104 and 104', respectively.

The free ends 120 and 120' of shafts 112 and 112' are threaded and adapted to be received by cooperatively threaded apertures 122, and 122' provided in slidable vertical panel members 96 and 96'. Simultaneous movement of knobs 114 and 114' causes the threaded ends 120 and 120' of shafts 112 and 112' to rotate thereby causing the helically threaded screw pitch to raise or lower the vertical panel members. Raising or lowering the vertical panel members 96 and 96' thus raises the embossing wheel 18 and rotary brush 20 since their axles 86 and 90 are rotatably mounted therein by bearings 92, 94 and 92', and 94'. Thus, the embossing wheel 18 and brush 20 may be positioned as required with respect to platen 44.

A horizontal member 124 is affixed to the upper surface of members 104 and 104'. Member 124 is preferably adapted to support reservoir 22 above the embossing wheel 18. Reservoir 22 is provided with a valve means (not shown) which is adapted to dispense fluid 126 contained therein, as required.

In operation, the dough processing apparatus of the present invention functions in the following manner. Premixed and preformed dough wads 24 prepared in a mixing and dispensing apparatus, (now shown) dispenses the dough wads 24 onto guide wall 54 where, by gravity, it falls onto the endless belt 14. The endless belt 14 is operatively coupled by gears 68, 69 and driving belt 74 to gear 76 which is affixed to the axle 78 of drive motor 16 and is caused to move horizontally in the direction of arrow 128 shown in FIGS. 1, 3, 4 and 5, when motor 16 is energized by having its power input leads, (not shown) inserted into a conventional source of electrical power, (not shown).

The wads of dough 24 thus move with the belt 14 until they engage the rotary embossing wheel 18, being embossed thereby, and then engage rotary brush 20 which is in intimate contact with both the periphery of the embossing wheel and the top surface of the embossed wad of dough (loaf) 28. The embossing wheel periphery is lubricated from fluid such as cooking oils being fed from reservoir 22 mounted thereabove, thus preventing any dough from sticking to the embossing wheel. Brush 20 functions to continuously clean off small particles of dough which may cling to the embossing wheel although lubricated. The brush 20 also serves to concomitantly coat the top surface of the embossed loaf 28 with cooking oil 126 or the like and to assist in propelling the loaf 28 in its proper direction of travel, i.e., in the direction indicated by arrow 128. The embossing wheel 18 and rotary brush 20 are operatively coupled by gears 84 and 88; drive belt 82 to the drive gear 80 of motor 16.

The oil reservoir 22 is provided with conventional valve means for supplying oil in a predetermined manner and in predetermined amounts, as is well known in the arts. The oil is supplied to the embossing wheel 18 and the rotary brush 20 and to the dough wads 24. It will be apparent that since the brush 20 and the embossing wheel 18 are disposed in tangential abutting engagement, oil will be supplied from the wheel to the brush. In this regard, the amount of oil supplied to the wheel is sufficient to provide oil for the embossed portion of the dough wad 24 and also for saturating the brush 22, to thereby enable the brush to coat the upper surface of the dough wads 24.

It will be apparent to those skilled in the art that although the oil reservoir 22 is depicted in FIG. 1, as being positioned adjacent the embossing wheel 18, the same may also be positioned adjacent brush 20.

The embossed loaves of bread 28 continue on belt 14 until reaching the end of the horizontal travel thereof where they may be placed into an oven, (not shown) for baking or storing on pallets (not shown) for baking at a later time.

Referring now to FIGS. 8 through 12, there is shown an alternative embodiment 130 of the embossing wheel 18. The embossing wheel 130 is preferably provided with tapered radially outwardly extending walls 132 which are arranged in a plurality of parallelograms 133. Each parallelogram 133 is angularly disposed with respect to one another to form a plurality of brick shaped designs as shown in FIG. 11 when projected on a flat surface. The tapered walls 132 are preferably thicker at the point closest to the core 134 of embossing wheel 130 and become narrower as they extend in a radially outwardly direction from the core (FIGS. 9 and 10) and function to facilitate the release of the dough wads during embossing thereof. A loaf of bread 136 embossed as shown in FIG. 12 will be obtained by passing a wad of dough beneath the embossing wheel 130 of the dough processing apparatus 10 of the present invention. Thus, the finished loaf of bread 136 appears to have been hand-braided although the bread loaf was made in the automatic continuous bread processing apparatus 10 disclosed herein. The appearance of bread 136 is that of the traditional Jewish bread known as challah.

Referring now to FIGS. 13 through 17, there is shown another alternative embodiment 138 of the rotary embossing wheel 18. The embossing wheel 138 is made similar to wheels 18 and 130 and has a plurality of radially outwardly extending tapered walls arranged to generally form pentagons 141. The pentagons 141 form a pentagonal design as shown in FIG. 16 when projected on a flat surface. Each of the pentagons 141 are disposed to have a common wall with an adjoining pentagon. A loaf of bread 144 as shown in FIG. 17 will be obtained by passing a wad of dough 24 beneath the embossing wheel 138 of the dough processing apparatus 10 of the present invention. The resultant bread 144 also resembles a challah.

Referring now to FIGS. 18 through 21, there is shown a further embodiment 146 of a rotary embossing wheel. The wheel 146 is preferably provided with a plurality of radially outwardly extending walls 148 equally divided about the periphery of the core 150 of embossing wheel 146. A central wall 152 is also provided thereby dividing the wheel 146 into twenty-four equal portions 154 disposed in alignment as shown in FIG. 21 when projected on a flat surface. A loaf of bread 156 embossed as shown in FIG. 22 will be obtained by passing a wad of dough 24 beneath the embossing wheel 146 of the processing apparatus 10 of the present invention. The wheel 146 is preferably adjusted to emboss almost clear through the dough wads so that the equal portions 154 embossed by the wheel 146 may be separated after baking to form conventional dinner rolls 158.

Hereinbefore, has been disclosed an automatic and continuous dough processing apparatus which is adapted to emboss designs on dough wads formed in predetermined masses simulating the braiding thereof. The apparatus is also adapted to emboss dough wads in equal portions to form conventional rolls.

While, I have shown and described the several preferred embodiments of my invention, it will be apparent to those skilled in the art that there are various modifications, changes and improvements which may be made therein without departing from the spirit and scope of the invention as set forth in the teachings herein.

What is claimed is:
1. A dough processing apparatus for embossing wads of dough formed in predetermined masses comprising
   an endless belt having an upper surface disposed in a substantially horizontal plane and being capable of movement along a longitudinal path,
   power drive means operatively coupled to said endless belt for providing movement thereof,
   frame means for mounting said power drive means and said endless belt,
   embossing means journaled in said frame means with the longitudinal axis thereof disposed substantially transverse to said longitudinal path and operatively coupled to said power drive means for imparting a predetermined design to each of said dough masses disposed on said endless belt,
   brush means journaled in said frame means and having the longitudinal axis thereof disposed substantially transverse to said longitudinal path.

2. A dough processing apparatus in accordance with claim 1, wherein
   said reservoir means is positioned above said embossing means and said brush means.

3. A dough processing apparatus in accordance with claim 1, wherein the axis of said brush means is disposed in planar horizontal alignment with the axis of said embossing means along said horizontal path.

4. A dough processing apparatus in accordance with claim 1, wherein
said frame means includes means for adjusting the height of said embossing means relative to said upper surface of said endless belt.

5. A dough processing apparatus in accordance with claim 1, wherein
said frame means includes a platen positioned beneath said endless belt and disposed in vertical alignment with said embossing means for insuring uniform penetration of said dough masses by said embossing means.

6. A dough processing apparatus in accordance with claim 1, wherein
said frame means includes means for dispensing wads of dough formed in predetermined masses upon said endless belt.

7. A dough processing apparatus in accordance with claim 1, wherein
said embossing means produces a pattern upon said dough wad which simulates the braiding thereof.

8. A dough processing apparatus in accordance with claim 6, wherein
said embossing means comprises a cylindrically shaped member having a periphery provided with tapered outwardly extending walls which substantially form a plurality of parallelograms, and
said parallelograms being angularly disposed with respect to one another for imparting a plurality of brick shaped impressions upon each of said dough masses.

9. A dough processing apparatus in accordance with claim 6, wherein
said embossing means comprises a cylindrically shaped member having a periphery provided with tapered outwardly extending walls substantially forming pentagons, and
each of said pentagons being positionally disposed to have at least one common wall with an adjoining pentagon for imparting a plurality of pentagonally shaped impressions upon each of said dough masses.

10. A dough processing apparatus in accordance with claim 6, wherein
said embossing means comprises a cylindrically shaped member having a periphery provided with tapered outwardly extending walls substantially forming rectangles, and
said rectangles being disposed in a predetermined alignment for imparting a plurality of rectangular shaped impressions upon each of said dough masses.

11. A dough processing apparatus in accordance with claim 1, wherein
said frame means includes means capable of rendering said frame mobile.

12. An embossing member for use in conjunction with a dough processing apparatus, said member comprising
a cylindrical core,
a first plurality of walls extending outwardly from the periphery of said core,
said first plurality of walls being disposed with respect to one another in a first predetermined pattern so as to substantially form a plurality of parallelograms,
said parallelograms being angularly disposed with respect to one another so as to be capable of imparting a plurality of brick shaped impressions upon a deformable mass,
a second plurality of walls extending outwardly from the periphery of said core, and
said second walls being disposed in a second predetermined pattern with respect to one another and with respect to said first plurality of walls so as to be capable of imparting a predetermined geometric impression upon said deformable mass.

13. An embossing member in accordance with claim 12, wherein
said outwardly extending walls are tapered, and
said peripheral ends of said walls are spaced from the periphery of said core so as to form a plurality of substantially geometrically solid parallelopiped recesses.

14. An embossing member for use in conjunction with a dough processing apparatus, said member comprising
a cylindrical core,
a first plurality of walls extending outwardly from the periphery of said core,
said first plurality of walls being disposed with respect to one another in a first predetermined pattern so as to substantially form a plurality of pentagonal configurations,
each of said pentagonal configurations being positionally disposed to have at least one common wall with an adjoining pentagonal configuration,
said pentagonal configurations being capable of imparting a plurality of pentagonally shaped impressions upon a deformable mass,
a second plurality of walls extending outwardly from the periphery of said core, and
said second walls being disposed in a second predetermined pattern with respect to one another and with respect to said first plurality of walls so as to be capable of imparting a predetermined geometric impression upon said deformable mass.

15. An embossing member in accordance with claim 14, wherein
said outwardly extending walls are tapered, and
said peripheral ends of said walls are spaced from the periphery of said core so as to form a plurality of substantially geometrically solid tapered pentahedral recesses.

16. An embossing member in accordance with claim 12, wherein
said first plurality of walls are disposed with respect to one another so as to substantially form a plurality of rectangular parallelograms, and
said rectangular parallelograms are disposed in predetermined rectilinear configuration so as to be capable of imparting a plurality of substantially rectangular shaped impressions upon a deformable mass.

17. An embossing member in accordance with claim 16, wherein
said first walls comprise
a singular peripheral wall disposed laterally with respect to said core and substantially centrally thereof,
a plurality of substantially equally spaced peripheral walls disposed longitudinally with respect to said core and in substantially perpendicularly intersecting relationship with respect to said singular wall, and said walls forming three-sided rectangular configurations.

18. An embossing member in accordance with claim 17, wherein said outwardly extending longitudinally disposed walls are tapered, walls are tapered, said peripheral ends of said longitudinally and laterally disposed walls being spaced from the periphery of said core so as to form a plurality of substantially geometrically solid rectilinearly disposed rectangular recesses.

* * * * *

UNITED STATES PATENT OFFICE
CERTIFICATE OF CORRECTION

Patent No. 3,936,255            Dated February 4, 1976

Inventor(s)   Joseph Vito Bellacicco

It is certified that error appears in the above-identified patent and that said Letters Patent are hereby corrected as shown below:

On the cover sheet item [73],"Elmhurst, N. J." should read -- Elmhurst, N. Y. --. Column 6, line 62, after "path" insert -- said brush means being operatively coupled to said power drive means and disposed in peripheral engagement with said embossing means and the upper surface of said dough masses for cleaning said embossing means and coating said dough upper surface and for propelling said dough masses along said longitudinal path, and reservoir means affixed to said frame means and disposed in operative relationship to said brush means for storing and dispensing fluids to said embossing means and said brush means in a predetermined manner and in predetermined amounts --.

Column 10, line 1, delete "walls are tapered,"

Signed and Sealed this eleventh Day of May 1976

[SEAL]

Attest:

RUTH C. MASON
Attesting Officer

C. MARSHALL DANN
Commissioner of Patents and Trademarks